Aug. 21, 1934.　　　T. LENNARD　　　1,970,893
LIQUID DISPENSING APPARATUS
Filed March 10, 1933　　5 Sheets-Sheet 1
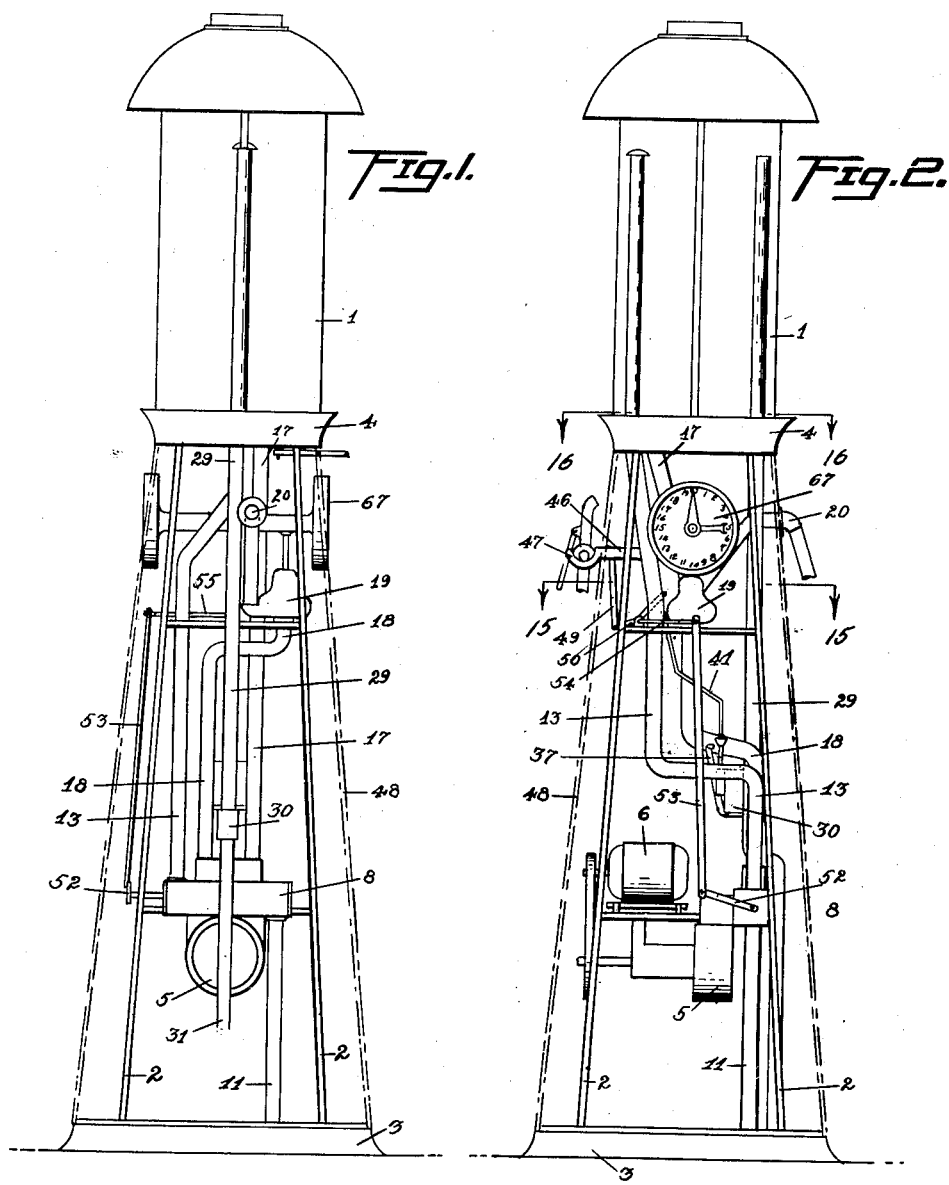
Inventor,
Thomas Lennard
By
Attorney Aug. 21, 1934.  T. LENNARD  1,970,893
LIQUID DISPENSING APPARATUS
Filed March 10, 1933  5 Sheets-Sheet 2
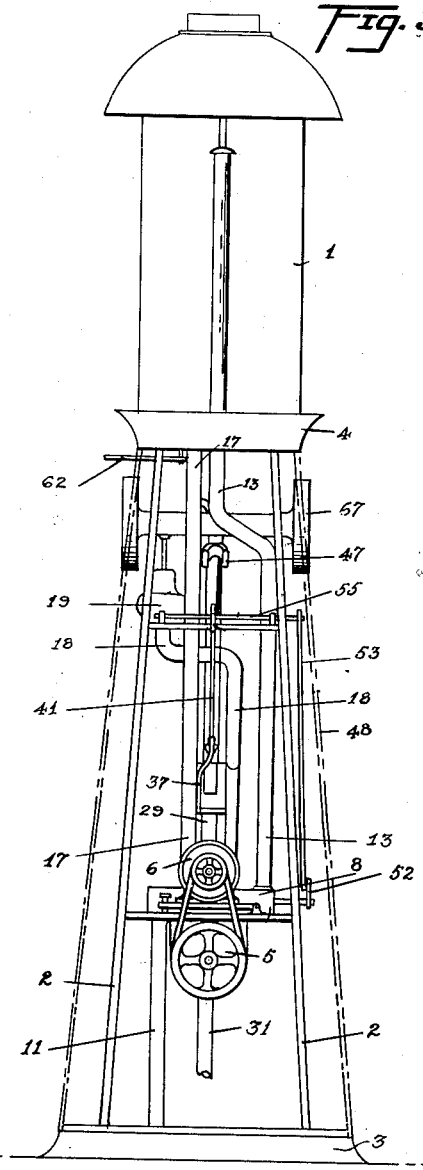
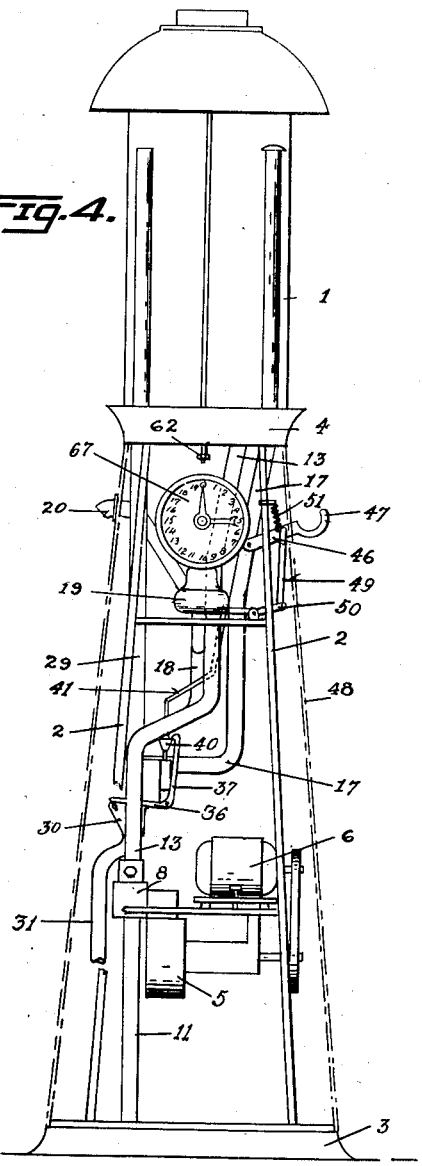
Inventor,
Thomas Lennard
By
Attorney

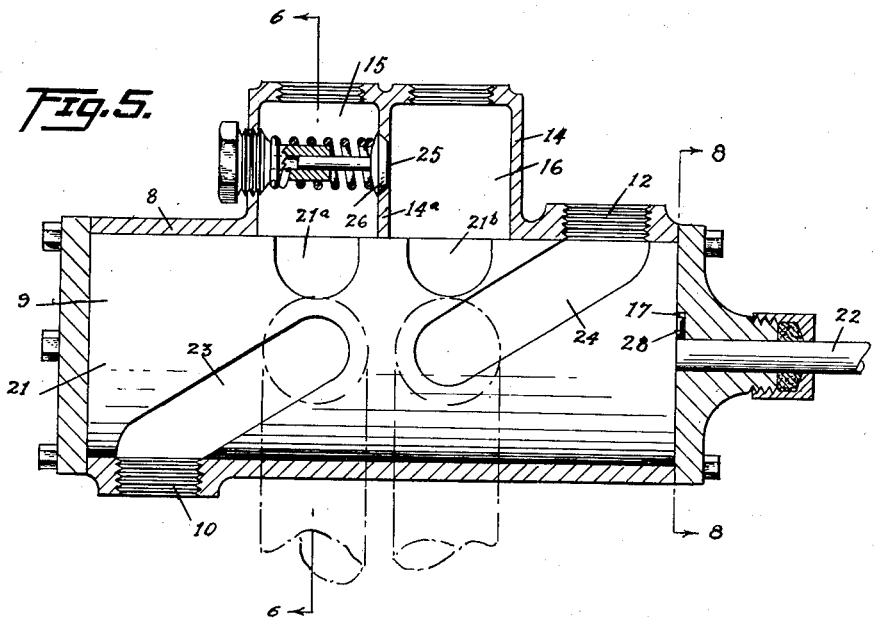
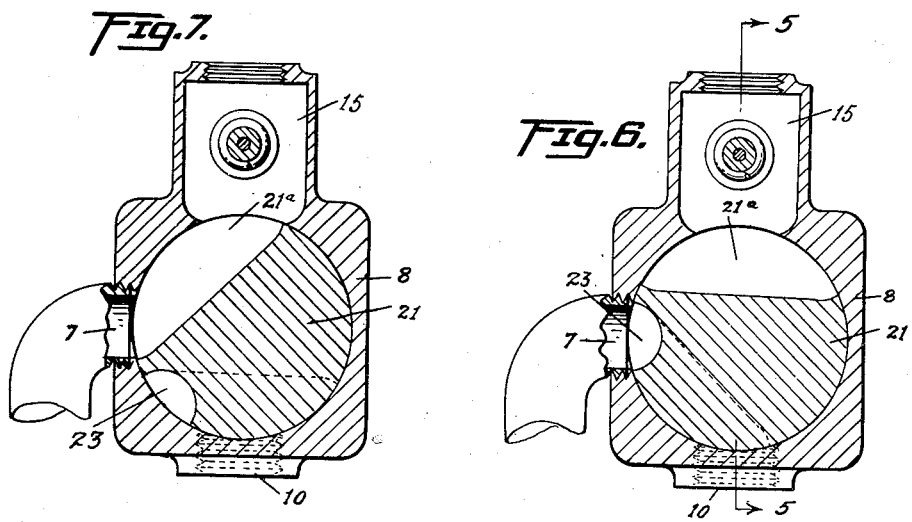

Aug. 21, 1934.    T. LENNARD    1,970,893
LIQUID DISPENSING APPARATUS
Filed March 10, 1933    5 Sheets-Sheet 4

Inventor,
Thomas Lennard
By
Attorney

Aug. 21, 1934.    T. LENNARD    1,970,893
LIQUID DISPENSING APPARATUS
Filed March 10, 1933    5 Sheets-Sheet 5
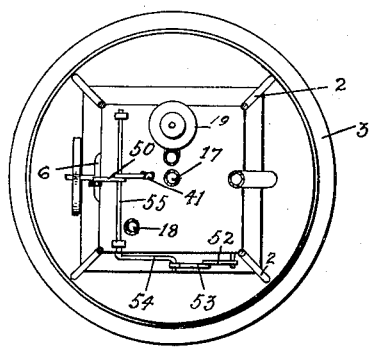
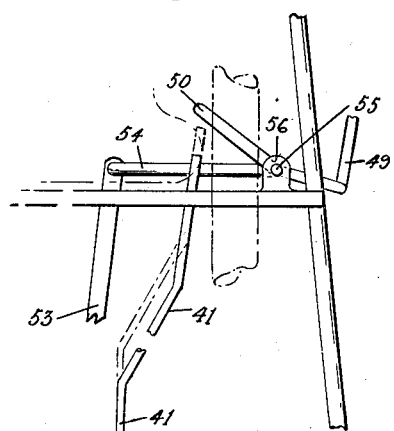
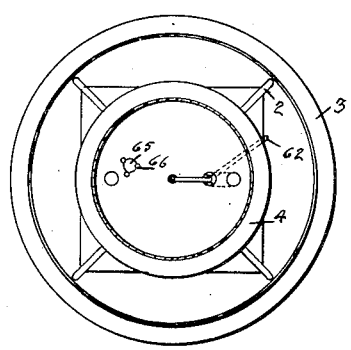
Inventor,
Thomas Lennard
By
Attorney Patented Aug. 21, 1934

1,970,893

UNITED STATES PATENT OFFICE 1,970,893

LIQUID DISPENSING APPARATUS

Thomas Lennard, Toronto, Ontario, Canada

Application March 10, 1933, Serial No. 660,306

16 Claims. (Cl. 221—100)

The invention relates to improvements in liquid dispensing apparatus as described in the present specification and shown in the accompanying drawings that form a part of the same.

The main object of the invention is to provide a gasoline dispensing apparatus having means for accurately measuring the amount of gasoline delivered and also including a visible tank whereby the purchaser may note the gasoline flowing to the visible tank and to the meter for delivery.

A further object of the invention is to provide means whereby on the completion of each dispensing operation the direction of flow of the liquid is automatically reversed to refill the overhead tank, and the overflow of liquid above the desired level utilized to shut off the motor.

A still further object is to provide a liquid dispensing apparatus which may be filled and drained in less time than that required in the operation of the types of dispensing devices used heretofore.

The invention consists in the novel features of construction, arrangements and combinations of parts described in the present specification and more particularly pointed out in the claims for novelty following.

In the drawings Figure 1 is a side elevation of my improved liquid dispensing apparatus, the outline of the casing being shown in dotted lines.

Figure 2 is a vertical elevation of the left hand side of the structure shown in Figure 1.

Figure 3 is a vertical elevation of the side of the structure opposite to that shown in Figure 1.

Figure 4 is a vertical elevation of the opposite side of the apparatus to that shown in Figure 2.

Figure 5 is a vertical longitudinal sectional view through the distributing valve chamber, taken substantially on the line 5—5 of Figure 6.

Figure 6 is a cross sectional view taken on the line 6—6 of Figure 5.

Figure 7 is a cross sectional view through the valve chamber shown in Figure 5, with the valve in its alternate position.

Figure 15 is a cross sectional view taken on the line 15—15 of Figure 2.

Figure 16 is a cross sectional view taken on the line 16—16 of Figure 2.

Figure 17 is a diagrammatic view, partly in section, of the elements constituting the automatic shut-off for the motor, the alternate position being shown in dotted lines.

Like numerals of reference indicate corresponding parts in the various figures.

Figure 8:
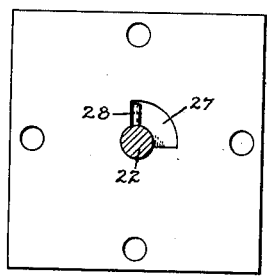
Figure 8 is a cross sectional view taken on the line 8—8 of Figure 5.
Figure 9:
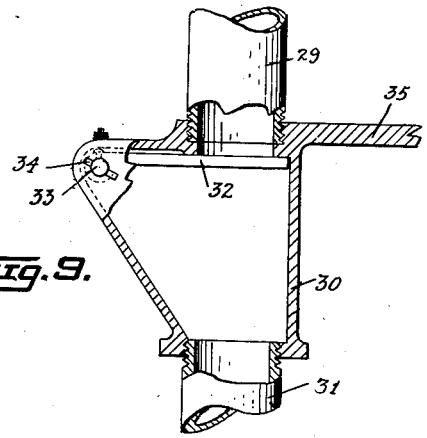
Figure 9 is a fragmentary view, partly in vertical section, showing the shut-off valve in the overflow pipe for shutting off the motor.
Figure 10:
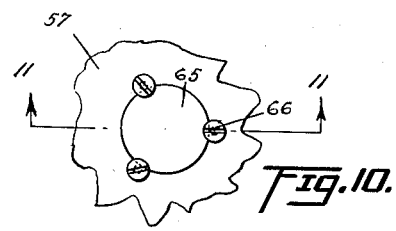
Figure 10 is a fragmentary view of the base of the visible tank showing the shut-off for the delivery pipe.
Figure 11:
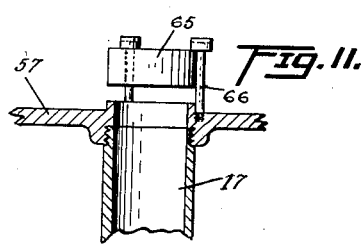
Figure 11 is a vertical sectional view through the top end of the delivery pipe and the shut off, taken on the line 11—11 of Figure 10.
Figure 12:
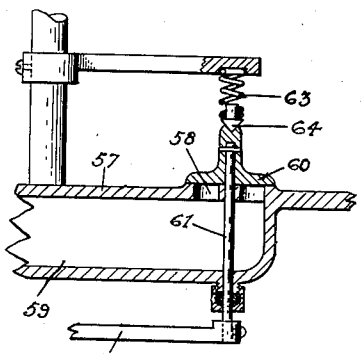
Figure 12 is a vertical sectional view through a portion of the base of the visible tank and the valve controlling the draining of said tank.
Figure 13:
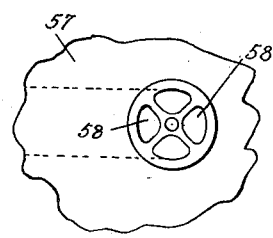
Figure 13 is a fragmentary detail showing the opening over which the valve shown in Figure 12 operates.
Figure 14:
Figure 14 is a plan view of the valve shown in Figure 12.

Referring to the drawings: According to the present invention the gasoline is adapted to be brought from the underground storage tank and temporarily stored in an overhead tank of the "visible" type from which it is caused to flow through the metering apparatus in the dispensing operation, and to this end a tank 1, hereinafter termed the receiving tank, having its sides constructed of glass, or other transparent material, is supported on a suitable framework, which latter in the present drawings is shown as consisting of a number of standards 2 extending upwardly from a base 3 and secured to the base 4 of the tank, but it is of course understood that the present invention does not reside in the particular form of support for the visible tank.

A single rotary action pump 5 located between the main storage tank and the receiving tank 1 and operatively connected with a motor 6, is used to draw the liquid from the main storage tank and deliver it to the visible tank, or to the meter and delivery nozzle, according to requirements.

Positioned adjacent to the pump 5 and having communicating passages 7 through its walls in register with the suction and pressure sides respectively of the said pump is a distributing valve casing 8, which casing is bored to provide a horizontal cylindrical chamber 9 having an opening 10 through the under face at one end thereof for the reception of a pipe 11 through which the liquid is drawn from the main storage tank, and an opening 12 through the top face thereof adjacent to the opposite end thereof, from which leads the pipe 13 to the interior of the visible tank 1. It will thus be apparent that in the filling of the visible tank the liquid is drawn up the pipe 11 into the casing 8, through one opening 7 into the pump through which it circulates from the suction side to the pressure side thereof and again enters the casing 8 from which it is forced up the pipe 13 into the visible tank 1.

The valve casing 8 has a central offset portion 14, preferably on the top side thereof, which in turn has a central partition 14a whereby the main horizontal chamber 9 is provided with two offset portions 15 and 16 respectively, one of which is adapted to receive a pipe 17 leading from the visible tank, and from the other of which extends the pipe 18 leading to the meter 19 from which extends the delivery pipe 20.

A rotary valve element 21 operates within the chamber 9 and is provided with a shaft 22 at one end thereof extending through the corresponding end of the casing 8 and suitably journalled therein, said valve having diagonal passages 23 and 24 respectively therethrough, said passages being so arranged that in one operating position of the valve the most widely separated ends of said passages will register with the pipes 11 and 13 respectively and the other ends thereof will register with the openings 7 of the suction and pressure sides respectively of the pump 5, so that an uninterrupted passage is provided from the main storage tank to the receiving tank through the distributing valve chamber and the pump.

The valve 21 is provided with two cut out portions 21a and 21b respectively along one side thereof constituting liquid passages, one of which is of sufficient dimensions to include the chamber 15 and the passage 7 in the suction side of the pump, as is clearly shown in Figure 7, and the other of which is of sufficient dimensions to include the chamber 16 and the passage 7 in the pressure side of the pump when the valve is in its alternate operating position to that shown in Figures 5 and 6, whereby the pipes 11 and 13 are closed by the solid portion of the valve and the liquid is allowed to flow down the pipe 17 into the chamber 15, through the opening 7 in the suction side of the pump into the opening in the pressure side of said pump, from which it is forced into the chamber 16 and out through the pipe 18 to the meter 19.

The partition 14a between the chambers 15 and 16 is provided with an opening 25 suitably faced to provide a valve seat in the inner wall of the chamber 15, and a valve 26 adjustably mounted in the opposite wall of said chamber 15 is spring held to said seat during the delivery operation. However, upon the discontinuation of the delivery due to the closing of the nozzle of the delivery pipe the pressure set up in the pump causes the liquid in the chamber 16 to open the valve 26 against the pressure of the spring and thus permit of the liquid circulating freely through the pump and the distributing valve chambers and thereby eliminating all danger of damage to the pump or other parts of the apparatus.

The various openings in the valve casing 8 and the valve 21 are so positioned in relation to each other that a predetermined degree of rotation of said valve reverses the direction of the flow of the liquid and in order to insure the correct degree of rotation and thus secure proper alignment at all times the inner face of the cap, or end wall of the casing 8 is provided with a slot 27 of sector formation and corresponding in length to the required rotation of the valve shaft 22, and in said slot operates a lateral extension 28 from said shaft, whereby the rotary movement of said shaft is restricted.

An overflow pipe 29 extending downwardly within the tank 1, from the point at which it is desired to limit the height of the liquid, carries away the overflow to a shut-off valve chamber 30 from which it is returned through the pipe 31 to the main storage tank. The valve chamber 30 is of greater dimensions than the bore of the pipe 29 and extending across the mouth thereof within the chamber is a flap, or valve, 32 which is carried by a shaft 33 journalled in the opposing walls of the valve casing. One end of said shaft extends outwardly from the casing and carries a laterally projecting cross member 34 which on the rotation of said shaft, due to the pressure of the liquid in passage from the pipe 29 into the valve chamber 30, is adapted to describe a horizontal arc.

A right angular lever pivoted at its apex to any suitable support, here shown as being supported by an extension 35 from the shut-off valve casing, has a horizontal arm 36 extending into the path of the rotatable extension 34 actuated by the movement of the valve 32, and also has a substantially vertically arranged arm 37 terminating in an inward hook 38. This lever is held normally to the position shown in Figures 4 and 17 preferably by means of a spring 39 exerting an inward pull on the vertical arm 37, or by any other suitable means.

Positioned in the path of movement of the hook shaped end of the vertical arm 37 and adapted to be held thereby to insure operation of the motor when such is required is a lateral extension, or boss, 40 carried by a vertically operating motor control arm 41 which in turn is suitably connected to the motor switch located in the switch box 42, which latter is preferably mounted on the extension, or platform, 35 from the shut-off valve casing 30. The arm 41 may be connected in any desired manner to the motor switch element but in the drawings is shown as being pivoted to the end of a knife switch 43 and said arm is normally held to its uppermost position, with the motor shut off, by means of a helical spring 44 exerting upward pressure on the lower end of said arm. The spring 44, and that part of the arm 41 which is connected to the knife switch is preferably enclosed in a suitable insulated casing 45 carried by the switch box 42. The arm 41 is suitably journalled in any desired form of support to permit of vertical reciprocatory movement and terminates a short distance below the nozzle supporting arm 46, which latter is suitably pivoted at its inner end within the framework of the apparatus and has a hook end 47 projecting beyond the casing 48 for the reception of the dispensing nozzle. A link 49 is pivoted to the nozzle supporting arm intermediate of the length of the latter and projecting downwardly therefrom and at its lower end is pivoted to the outer end of a centrally fulcrumed inwardly projecting link 50, the inner end of which is adapted on the raising of the outer end of the nozzle supporting arm to bear against the top end of the vertical motor control arm 41 and cause same to be lowered and thus operate the motor switch to start the motor. In the latter condition the boss 40 carried by the motor control arm is moved downwardly for engagement by the hook end 38 of the arm 37, by means of which it is held, until released, by the movement of said arm in an outward direction. The outer end of the nozzle supporting arm 46 may be held raised, when relieved of the weight of the nozzle, by any desired means, such as by the use of a spring 51 connecting same to any desired part of the framework and exerting a pull on said arm. It will thus be seen that upon the removal of the nozzle from the supporting arm the motor and pump will be immediately started.

It is essential that the distributing valve 21 be partially rotated to its alternate position on the completion of each filling and dispensing operation in order to divert the flow of the liquid to the proper pipes, according to whether the tank 1 is to be filled or the liquid is to be dispensed, and to this purpose a lateral arm 52 is fixed to the outer end of the shaft 22 and this arm at its other end is pivotally connected to the lower end of a vertical rod 53 which at its top end is pivoted to the right angle end 54 of a shaft 55, which latter is rotatably journalled in suitable brackets 56 and constitutes the fulcrum for the link 50 to which it is rigidly secured. Thus when the nozzle is removed from the support in the dispensing operation the valve 22 will be in position to permit of the liquid flowing from the receiving tank to the meter and nozzle and when the nozzle is replaced the said valve will be partially rotated to open the passages from the main storage tank to the receiving tank.

The bottom 57 of the tank 1 is provided with openings 58 therethrough into a passage 59 which leads to the overflow pipe 29 and by means of which the said tank may be drained when required, the openings being normally closed by means of any desired form of valve which may be operated from the exterior of the casing. While the particular design of the valve closure used does not constitute a feature of the present invention a practical illustration is shown in which the openings 58 are adapted to be closed by a wing valve 60 mounted on a rotatable arm 61 which extends downwardly through the bottom 57 and the bottom of the passage 59 and carries an operating handle 62 which extends to the exterior of the casing, said valve preferably being spring held to its position, in the present instance by a spring 63 exerting pressure on a conical element 64 fitting a correspondingly shaped seat in the top end of said valve.

It is essential that means be provided to close the pipe 17 against the possibility of air within the tank 1 entering the pump after the tank has been emptied, so as to prevent the continued operation of the meter by such air flow and a practical form of valve, or closure, consists of a float element 65 positioned above the end of said pipe within the tank and having suitable means for limiting the upward movement of the float in the liquid, one form of such means consisting of pins 66 embedded in the bottom of the tank circumferentially of said float and having heads projecting inwardly over said float.

In the operation of this invention, assuming that the receiving tank is empty and it is desired to fill same in preparation for the dispensing operation. The nozzle is temporarily removed from the pivoted supporting arm 46, allowing the outer end of said arm to rise by the action of the spring 51, or to be raised manually in the absence of such a spring, and thus raise the link 49 which in turn causes the operation of the lever 50, causing the outer end of same to descend and force the motor control arm 41 downwardly and operate the motor switch 43 to start the motor. When the arm 41 has descended sufficiently to operate the motor switch the hook end 38 of the arm 37 of the shut-off valve slides over the top of the collar 40 carried by said arm 41 and prevents said arm from moving upwardly. Co-incident with the operation of the levers 49 and 50, which results in the starting of the motor, the shaft 55 is rotated causing the right angular end 54 thereof to rotate and force the vertical arm, or rod, 53 downwardly whereby the link 52 is rotated and imparts simultaneous rotary movement to the distributing valve 21 and thus brings said valve into the position for dispensing. However, as the removal of the nozzle from the arm 46 is only temporary for the purpose of operating the various elements just described to start the motor said nozzle is at once returned to its position on the arm 46 which immediately causes reverse rotation of the shaft 55 and consequently of the valve 21 to bring said valve into the position where the diagonal passages 23 and 24 are in register at their one ends with the pipes 11 and 13 respectively and at their other ends the passages 7 in the suction and pressure sides respectively of the pump 5, so that a clear passage is formed from the main storage tank to the overhead tank through the said pipe 11, the passage 23, the passages in the suction and pressure sides of the pump, and the pipe 13. When the liquid has reached the level of the top of the overflow pipe 29 the overflow goes down said pipe into the shut-off valve chamber 30 and on through the pipe 31 to the main storage tank. The liquid in entering the chamber 30 tips the valve 32 causing the rotation of the shaft 33 and the cross member 34, which latter element raises the outer end of the horizontal arm 36 and consequently moves the vertical arm 37 out of engagement with the collar 40 of the motor control arm 41 and allowing the latter to be moved upwardly by the action of the spring 44 to shut off the motor.

In the dispensing operation the nozzle is raised from the arm 46 and through the operation of the levers 49 and 50 and the motor control arm 41 the motor is again started with the said arm 41 held to its down position by the engagement of the hook end of the arm 37 with the collar 40 of the arm 41, as described hereinabove. The raising of the arm 46 causes the rotation of the shaft 55 and through the movement of the arm 54 thereof, the vertical rod 53 and the link 52 causes the partial rotation of the valve 21 to the position where the cut away portion 21a extends across the mouth of the chamber 15 and the passage to the suction side of the pump, and the cut away portion 21b extends across the mouth of the chamber 16 and the passage from the pressure side of the pump so that a clear passage from the tank 1 to the meter is provided through the pipe 17, the valve 21, the pump 5 and the pipe 18. From the meter the liquid flows through the pipe 20 to the nozzle. When the dispensing operation is finished the nozzle is replaced on the arm 46 causing the outer end of said arm to be lowered and thus reverse the direction of rotation of the shaft 55 and consequently rotate the valve 21 to again complete the passage from the main storage tank to the overhead tank without cutting off the motor which continues to function until the overhead tank 1 has again become filled and the overflow therefrom causes the operation of the arm 37 to release the collar 40 carried by the motor control arm 41 and thereby shut off the motor. A suitably graduated dial 67 is operated by the meter to show the amount of liquid dispensed.

When the tank 1 is almost completely emptied the float 65 drops into engagement with the bottom of the tank and closes the top end of the pipe 17 to prevent operation of the meter by the action of the air within said tank.

When it is desired to drain the tank 1 it is simply necessary to move the handle 62 laterally and thus rotate the valve 60 to permit of the liquid flowing into the passage 59 to the overflow pipe 29.

When it is desired to incorporate two overhead tanks in the apparatus a like number of mechanical units as described hereinabove are included in the one housing.

While the preferred embodiment of the present invention has been herein shown and described it is of course to be understood that alterations in details of construction and arrangements of parts as comes within the scope of the following claims for novelty may be made.

What I claim is:—

1. In liquid dispensing apparatus, the combination of a main storage tank, a measuring device, a temporary storage tank adapted to receive the liquid before delivery to said measuring device, a pump for conducting the liquid from said main storage tank to said temporary storage tank and for delivering same from said temporary storage tank to said measuring device, reciprocable valve mechanism directing the flow of liquid from said pump alternately to said temporary tank and to said measuring device, means for moving said valve mechanism from one to its alternate position, said means including a pivoted support for a dispensing nozzle connecting with said measuring device, means operated by said pivoted support for imparting a reciprocable rotary movement to said valve mechanism, and means for restricting the rotary movement of said valve mechanism.

2. In liquid dispensing apparatus, the combination of a main storage tank, a meter, a visible temporary storage tank adapted to receive the liquid in predetermined quantity before delivery to said meter, a motor, a pump operated by said motor for conducting the liquid from said main storage tank to said temporary storage tank and for delivery from said temporary storage tank to said meter, a rotary reciprocable valve directing the flow of liquid from said pump alternately to said temporary storage tank and to said meter, means for moving said valve from one to its alternate position, means controlled by the movement of the last mentioned means for starting said motor, an overflow pipe in said temporary storage tank, and means operated by the liquid in said overflow pipe to shut off said motor.

3. In liquid dispensing apparatus, a main storage tank, a temporary storage tank, measuring apparatus through which the liquid passes in discharge from said temporary storage tank, a distributing valve casing having an inlet adjacent to one end thereof for the liquid from the main storage tank and an outlet adjacent to the other end thereof for the emission of liquid to said temporary storage tank, said valve casing also having an inlet receiving a discharge pipe from said temporary storage tank and an outlet registering with a delivery pipe leading to said measuring apparatus, a pump having openings in the wall of the suction and pressure portions respectively thereof registering with openings through the walls of said distributing valve casing, a distributing valve reciprocating within said casing for controlling the direction of flow of liquid from said pump, said valve having diagonal passages therethrough adapted at their one ends, in one position of the valve, to register with the inlet and outlet respectively at opposite ends of said casing and at their other ends registering with said openings in the suction and pressure portions respectively of said pump, said valve also having recesses in the wall thereof adapted in the alternate position of said valve to provide passages from the inlet from said temporary storage tank to the opening in the suction portion of said pump and from the opening in the pressure portion of said pump to the outlet to said measuring apparatus, and means for reciprocating said valve from one to its alternate position.

4. In liquid dispensing apparatus, in combination, a main storage tank, a meter, an intermediate transparent storage tank, pump mechanism for conducting liquid from said main storage tank to said transparent tank, and for delivering same to said meter, valve mechanism directing the flow of liquid from said pump to said transparent storage tank and said meter alternately, a motor including a switch, a dispensing hose leading from said meter and including a nozzle, a pivoted support for said nozzle, means operable through the movement of said nozzle support on the removal of said nozzle therefrom for operating said motor switch to start said motor, and means responsive to the action of the overflow from said transparent storage tank to move said means for operating said motor switch to shut off said motor.

5. In liquid dispensing apparatus, in combination, a main storage tank, a meter, a secondary storage tank, pump mechanism for conducting liquid from said main storage tank to said secondary storage tank and for delivering same to said meter, valve mechanism directing the flow of liquid from said pump to said secondary storage tank and said meter alternately, a motor including a switch, a reciprocable arm operatively connected to said motor switch, means normally holding said switch in its open condition, a dispensing hose leading from said meter and including a nozzle, a pivoted nozzle support, means operable on the movement of said nozzle support subsequent to the removal of said nozzle therefrom to move said arm and thereby close said switch, means engaging said arm in the closed condition of the switch, an overflow pipe receiving the overflow from said secondary storage tank, means responsive to the action of the liquid in said overflow pipe to cause the release of said arm and thereby shut off the motor.

6. In liquid dispensing apparatus, a main storage tank, a measuring device, a dispensing hose connecting with said measuring device and including a nozzle, a visible storage tank for temporarily storing liquid prior to delivery to said measuring device, a pump, a valve casing having a cylindrical bore providing an elongated horizontal valve chamber having an inlet adjacent to one end thereof for a pipe from said main storage tank and an outlet adjacent to the other end thereof registering with a pipe leading to the interior of said visible tank, said casing also having openings therethrough registering with the openings in the suction and pressure portions respectively of said pump, said casing also having a lateral offset portion partitioned centrally to provide two chambers communicating with the main chamber, one of said chambers having an inlet receiving a discharge pipe from said visible storage tank and the other of said chambers having an outlet from which extends a delivery pipe leading to said measuring device, said partition being provided with a valve seat, a valve spring-held normally to said seat and movable therefrom by the pressure of liquid in the last mentioned chamber on the closing of said nozzle during the operation of the pump, a distributing valve mounted for rotary reciprocation in said valve casing and controlling the direction of flow of liquid from said pump, and means for rotating said distributing valve from one to its alternate position.

7. In liquid dispensing apparatus, a main storage tank, a measuring device, a visible storage tank, a pump, a pipe line leading from said main storage tank to said visible storage tank through said pump, a suction pipe line leading from said visible storage tank to said measuring device through said pump, dispensing means leading from said measuring device, and means operated by the suction within said suction pipe for preventing the operation of said measuring device upon the almost complete discharge of the liquid from said visible storage tank.

8. In liquid dispensing apparatus, a main storage tank, a measuring device, a visible storage tank, a pump, a pipe line leading from said main storage tank to said visible storage tank through said pump, a suction pipe line leading from said visible storage tank to said measuring device through said pump, dispensing means leading from said measuring device, and means for preventing the air within said visible storage tank being drawn into said suction pipe line upon the discharge of the liquid therefrom, said means including a float normally held suspended in the liquid in said visible tank and adapted to be drawn downwardly over the top end of said suction pipe in the latter stages of the emptying of said visible tank.

9. In a liquid dispensing apparatus, a main storage tank, a receiving tank, a service connection leading from the main storage tank to the receiving tank, a dispensing connection leading from the receiving tank, a pump, and a valve element in said service and dispensing connections, said valve element having communication with the suction and delivery sides of the pump, the valve element in one position directing the fluid flow through the service connection under pump pressure and in another position directing the fluid flow through the dispensing connection under pump pressure.

10. In a liquid dispensing apparatus, a main storage tank, a receiving tank, a service connection leading from the main storage tank to the receiving tank, a dispensing connection leading from the receiving tank, a pump, a valve element in said service and dispensing connections, said valve element having communication with the suction and delivery sides of the pump, the valve element in one position directing the fluid flow through the service connection under pump pressure and in another position directing the fluid flow through the dispensing connection under pump pressure, and means for simultaneously controlling the valve and pump.

11. In a liquid dispensing apparatus, a main storage tank, a receiving tank, a service connection leading from the main storage tank to the receiving tank, a dispensing connection leading from the receiving tank, a pump, a valve element in said service and dispensing connections, said valve element having communication with the suction and delivery sides of the pump, the valve element in one position directing the fluid flow through the service connection under pump pressure and in another position directing the fluid flow through the dispensing connection under pump pressure, a nozzle forming the delivery end of the dispensing connection, a nozzle support movable in one direction under the weight of the nozzle and movable in the opposite direction when freed from the weight of the nozzle, and means whereby the movement of the nozzle support simultaneously controls the pump and valve.

12. In a liquid dispensing apparatus, a main storage tank, a receiving tank, a pump, a valve casing having open communication with the suction and pressure sides of the pump, a service pipe leading from the main storage tank to the interior of the valve casing, a second service pipe leading from the interior of the valve casing to the receiving tank, a dispensing pipe leading from the receiving tank to the valve casing, a second dispensing pipe leading from the valve casing for delivery of the fluid, and a valve operable in said casing and adapted in one position to establish communication between the respective service pipes and the pump and in another position to establish communication between the first and second dispensing pipes through the pump.

13. In a liquid dispensing apparatus, a main storage tank, a receiving tank, a pump, a valve casing having open communication with the suction and pressure sides of the pump, a service pipe leading from the main storage tank to the interior of the valve casing, a second service pipe leading from the interior of the valve casing to the receiving tank, a dispensing pipe leading from the receiving tank to the valve casing, a second dispensing pipe leading from the valve casing for delivery of the fluid, a valve operable in said casing and adapted in one position to establish communication between the respective service pipes and the pump and in another position to establish communication between the first and second dispensing pipes through the pump, and means for closing communication between the receiving tank and the first dispensing pipe in the absence of fluid in the receiving tank.

14. In a liquid dispensing apparatus, a main storage tank, a receiving tank, a pump, a valve casing having open communication with the suction and pressure sides of the pump, a service pipe leading from the main storage tank to the interior of the valve casing, a second service pipe leading from the interior of the valve casing to the receiving tank, a dispensing pipe leading from the receiving tank to the valve casing, a second dispensing pipe leading from the valve casing for delivery of the fluid, a valve operable in said casing and adapted in one position to establish communication between the respective service pipes and the pump and in another position to establish communication between the first and second dispensing pipes through the pump, and means controlled by the fluid in the receiving tank for closing communication between the receiving tank and the first dispensing pipe in the absence of fluid in the receiving tank.

15. In a liquid dispensing apparatus, a main storage tank, a receiving tank, a pump, a valve casing having open communication with the suction and pressure sides of the pump, a service pipe leading from the main storage tank to the interior of the valve casing, a second service pipe leading from the interior of the valve casing to the receiving tank, a dispensing pipe leading from the receiving tank to the valve casing, a second dispensing pipe leading from the valve casing for delivery of the fluid, a valve operable in said casing and adapted in one position to establish communication between the respective service pipes and the pump and in another position to establish communication between the first and second dispensing pipes through the pump, a motor for operating the pump, a switch for controlling the motor, a nozzle forming the terminal of the second dispensing pipe, and a movable support for the nozzle, said movable support when relieved of the weight of the nozzle serving to operate the switch.

16. In a liquid dispensing apparatus, a main storage tank, a receiving tank, a pump, a valve casing having open communication with the suction and pressure sides of the pump, a service pipe leading from the main storage tank to the interior of the valve casing, a second service pipe leading from the interior of the valve casing to the receiving tank, a dispensing pipe leading from the receiving tank to the valve casing, a second dispensing pipe leading from the valve casing for delivery of the fluid, a valve operable in said casing and adapted in one position to establish communication between the respective service pipes and the pump and in another position to establish communication between the first and second dispensing pipes through the pump, a motor for operating the pump, a switch for controlling the motor, a nozzle forming the terminal of the second dispensing pipe, a movable support for the nozzle, said movable support when relieved of the weight of the nozzle serving to operate the switch, and means operated by said support for controlling the valve.

THOMAS LENNARD.